R. TREVISAN.
CHEESE CUTTER.
APPLICATION FILED DEC. 15, 1913.
1,104,718.
Patented July 21, 1914.
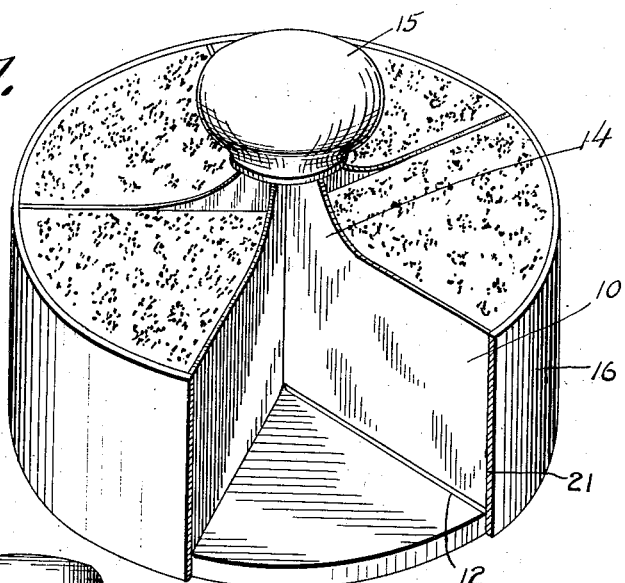
Fig. 1.
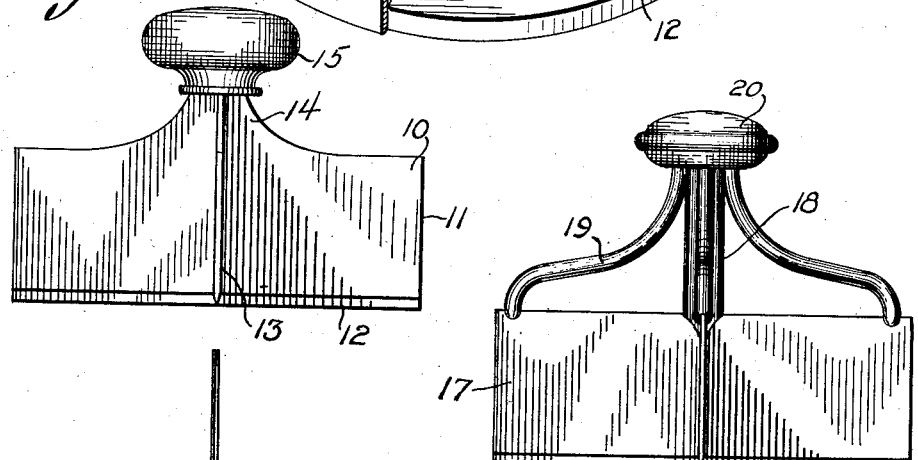
Fig. 2.
Fig. 4.
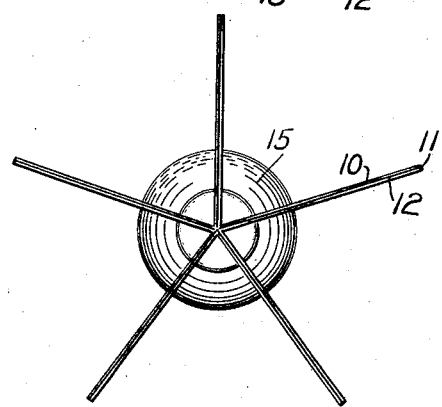
Fig. 3.
Witnesses
F. B. Wooden
E. Valton Brewington.
Inventor
Richard Trevisan,
By Henry G. Brewington.
Attorney

UNITED STATES PATENT OFFICE.

RICHARD TREVISAN, OF WORCESTER, MASSACHUSETTS.

CHEESE-CUTTER.

1,104,718.  Specification of Letters Patent.  Patented July 21, 1914.

Application filed December 15, 1913. Serial No. 806,907.

*To all whom it may concern:*

Be it known that I, RICHARD TREVISAN, a citizen of the United States, residing at Worcester, in the county of Worcester and State of Massachusetts, have invented certain new and useful Improvements in Cheese-Cutters, of which the following is a specification.

This invention relates to cutting devices of the type wherein such are used to divide a mass of plastic material into equal parts.

More particularly the invention relates to a cutter for dividing cheeses, especially of the Camembert type, into equal portions for serving on the table. In the handling, of cheeses of this type in restaurants difficulty is experienced in serving attractive portions by reason of the fact that the cheese is of such nature that when removed from the box wherein it is packed it is apt to become distorted in shape under the pressure of an ordinary knife and consequently the served portions present an irregular and unattractive appearance.

The principal object of the present invention is to provide a cutter especially adapted for the service of this class of cheeses which can be used to divide the cheese into equal portions while the cheese is supported in the box.

To this end, the device consists of a cutter comprising a series of novel blades radially arranged and means for supporting these blades in their radial relation.

The invention further consists of certain novel details of construction and combination of parts hereinafter fully described, illustrated in the accompanying drawings, and specifically claimed.

In the accompanying drawings, like characters of reference indicate like parts in the several views, and:—

Figure 1 is a perspective view of the improved cutter showing the use of the same in connection with a cheese in its box, one portion having been removed for service on the table. Fig. 2 is a side elevation of the form of cutter disclosed in Fig. 1. Fig. 3 is a bottom plan view of this cutter. Fig. 4 is a side elevation illustrating a modified form of cutter having certain arms to reinforce the cutting blades.

In the embodiment of the invention shown there is provided a series of blades 10 each having an outer edge 11, a bottom edge 12 sharpened to constitute a knife and an inner edge 13. Each of these blades moreover has at its inner end an upwardly extending portion 14 and the inner edges of these blades are all brought together as clearly shown in Fig. 3 and are held by means of a knob handle 15 fitting over the upwardly and radially extending portions 14. The blades are arranged radially and while in the present instance five of these blades are shown yet it will be obvious that any desired number may be used. These blades are made of any suitable material but are preferably made of such metals as white metal, silver, aluminum or the like which will not tarnish or corrode from contact with the cheese.

The blades are all of the same dimensions and consequently their outer edges 11, which are perpendicular to their cutting edges 12 all lie on the surface of the same cylinder. These blades are furthermore so proportioned that the ordinary cylindrical box wherein Camembert and other like cheeses are packed will fit neatly about the device so that the edges 11 will contact with the inside of said box when the cutter is placed therein. The edges 12 will also contact with the bottom of said box.

In the modified form shown in Fig. 4 the blades 17 are of the same general rectangular form as in the previously described type and these blades are held together at the center by means of a bar 18 which engages the upper parts of the inner ends of said blades while curved bars 19 have their outer ends engaging with the outer ends of said blades. All of these bars 18 and 19 are brought together at the center as indicated in Fig. 4 and have fitted thereover a head or handle 20 by means of which the device can be manipulated.

In using the device the cheese, which comes wrapped in tin foil within the box 16, is carefully removed from the box and unwrapped. It is then placed back in the box and the cutter, being grasped by its handle, is placed in position over the cheese and forced down into the box, the cover of the box being left off to permit such operation. The boxes in which such cheeses are packed are usually of very thin wood or of paste board and in either case when it is desired to serve a portion of the cheese the side of rim of the box is cut away between two of the blades 10 or 17 along the lines as indicated at 21. Then the point of the ordinary knife is inserted between the bottom of the box and the under side of the portion of cheeses thus exposed and the same lifted carefully out and deposited in the guest's plate ready for service. Successive portions may in like manner be removed by a single cutting through the box 16 and removing the cheese thus exposed.

It is to be noted that the portions thus served are equal in dimensions and are of uniform appearance and it is also to be noted that the cut sides of the cheese, which are liable to become discolored when exposed to the air, are kept by the blades from such exposure and are thus prevented from discoloration or shrinkage. Moreover by serving the cheese in this way there is no loss as the entire cheese may be served.

It will be observed that the casing or box 16 coöperates with the blades and retains the portions which are cut by the blades in proper shape for service until the portion of the casing between adjacent blades has been removed.

There has thus been provided a simple and efficient device of the kind described and of the character specified.

Having thus described the invention, what is claimed as new, is:—

A cutter for dividing Camembert and other circular cheeses which are packed in individual receptacles into equal sector portions and to deliver said portions successively to an open space cut in said receptacles, comprising a plurality of substantially rectangular blades radially arranged with their inner edges contacting throughout their entire length and all of their bottom edges lying in the same plane and with perpendicular outer edges, and upward extensions connected to said blades terminating in a common handle serving to retain said blades in their relative positions, said blades having unobstructed sides to contact throughout the entire area of the sides of the sectors of cheese to protect and serve as pushers for said sectors when the cutter is rotated.

In testimony whereof I affix my signature in presence of two witnesses.

RICHARD TREVISAN.

Witnesses:
HARTLEY W. BARTLETT,
GEORGE A. ROCKWOOD.